(12) United States Patent
Katsuki et al.

(10) Patent No.: US 10,878,337 B2
(45) Date of Patent: Dec. 29, 2020

(54) ASSISTANCE GENERATION

(71) Applicant: INTERNATIONAL BUSINESS MACHINES CORPORATION, Armonk, NY (US)

(72) Inventors: Takayuki Katsuki, Tokyo (JP); Tetsuro Morimura, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 890 days.

(21) Appl. No.: 15/212,893

(22) Filed: Jul. 18, 2016

(65) Prior Publication Data

US 2018/0018568 A1 Jan. 18, 2018

(51) Int. Cl.
*G06N 20/00* (2019.01)
*G06N 7/00* (2006.01)

(52) U.S. Cl.
CPC ............. *G06N 20/00* (2019.01); *G06N 7/005* (2013.01)

(58) Field of Classification Search
CPC ........ G06N 20/00; G06N 7/005; G06N 5/022; G06N 99/005; G10L 15/142; G10L 15/144; G10L 17/16; G05B 2219/39205; G05B 2219/31358
USPC ......................................................... 706/12
See application file for complete search history.

(56) References Cited

U.S. PATENT DOCUMENTS

| 8,751,871 | B2 | 6/2014 | Armstrong et al. |
| 9,116,600 | B2 | 8/2015 | Gonsalves |
| 9,208,215 | B2 | 12/2015 | Mahaffey et al. |
| 2012/0233003 | A1* | 9/2012 | Calman ................... G06Q 30/06 705/16 |
| 2013/0318023 | A1* | 11/2013 | Morimura ............... G06N 20/00 706/46 |
| 2014/0207935 | A1 | 7/2014 | Gopshtein et al. |
| 2016/0078027 | A1 | 3/2016 | Katsuki et al. |

FOREIGN PATENT DOCUMENTS

JP 2016-58027 A 4/2016

OTHER PUBLICATIONS

Chen et al., "POMDP-lite for Robust Robot Planning under Uncertainty", 2016 IEEE International Conference on Robotics and Automation (ICRA) Stockholm, Sweden, May 16-21, 2016. (Year: 2016).*
Poupart et al., "An Analytic Solution to Discrete Bayesian Reinforcement Learning", Proceedings of the 23rd International Conference on Machine Learning, Pittsburgh, PA, 2006. (Year: 2006).*

* cited by examiner

*Primary Examiner* — Dave Misir
(74) *Attorney, Agent, or Firm* — Tutunjian & Bitetto, P.C.; Randall Bluestone

(57) ABSTRACT

An assistance strategy may be generated with a generating apparatus including a processor, and one or more computer readable mediums collectively including instructions that, when executed by the processor, cause the processor to create a reward estimation model for estimating a reward for assisting at least one subject by analyzing a history of input by the subject, create a decision making model including a plurality of forms of assistance and estimated rewards for each form of assistance based on the reward estimation model and the history of input by the subject, and generate an assistance strategy based on the decision making model.

19 Claims, 10 Drawing Sheets

US 10,878,337 B2

ASSISTANCE GENERATION

BACKGROUND

Technical Field

The present invention relates to generation of assistance.

Description of the Related Art

Modern interactive electronic devices, such as smartphones, are becoming increasingly sophisticated, frequently used, and frequently changed. Due to this, learning to use such devices can be difficult, requiring assistance. However, everyone has a different learning curve, and has different amounts of background knowledge before using a new device. Since personal assistance may be time consuming and costly, automated assistance is desirable. There is a need for generation of an assistance strategy that can provide effective support for operation of such devices.

SUMMARY

According to a first aspect of the present invention, provided is a generating apparatus including a processor, and one or more computer readable mediums collectively including instructions that, when executed by the processor, cause the processor to create a reward estimation model for estimating a reward for assisting at least one subject by analyzing a history of input by the subject, create a decision making model including a plurality of forms of assistance and estimated rewards for each form of assistance based on the reward estimation model and the history of input by the subject, and generate an assistance strategy based on the decision making model. The first aspect may also include the method performed by the apparatus, and a program for implementing the method.

According to a second aspect of the present invention, provided is a device including a processor, an interface in communication with the processor, and one or more computer readable mediums collectively including instructions that, when executed by the processor, cause the processor to receive a reward estimation model created for estimating a reward for assisting at least one person by analyzing a history of input by the person, receive an assistance strategy generated based on a decision making model, the decision making model created based on the reward estimation model and the history of input by the person, the decision making model including a plurality of states, state transitions caused by assistances, and rewards for assistances, estimate a reward for assisting a target person who operates the device, select an assistance to be presented to the target person based on the assistance strategy, and present the selected assistance through the interface.

The summary clause does not necessarily describe all necessary features of the embodiments of the present invention. The present invention may also be a sub-combination of the features described above.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
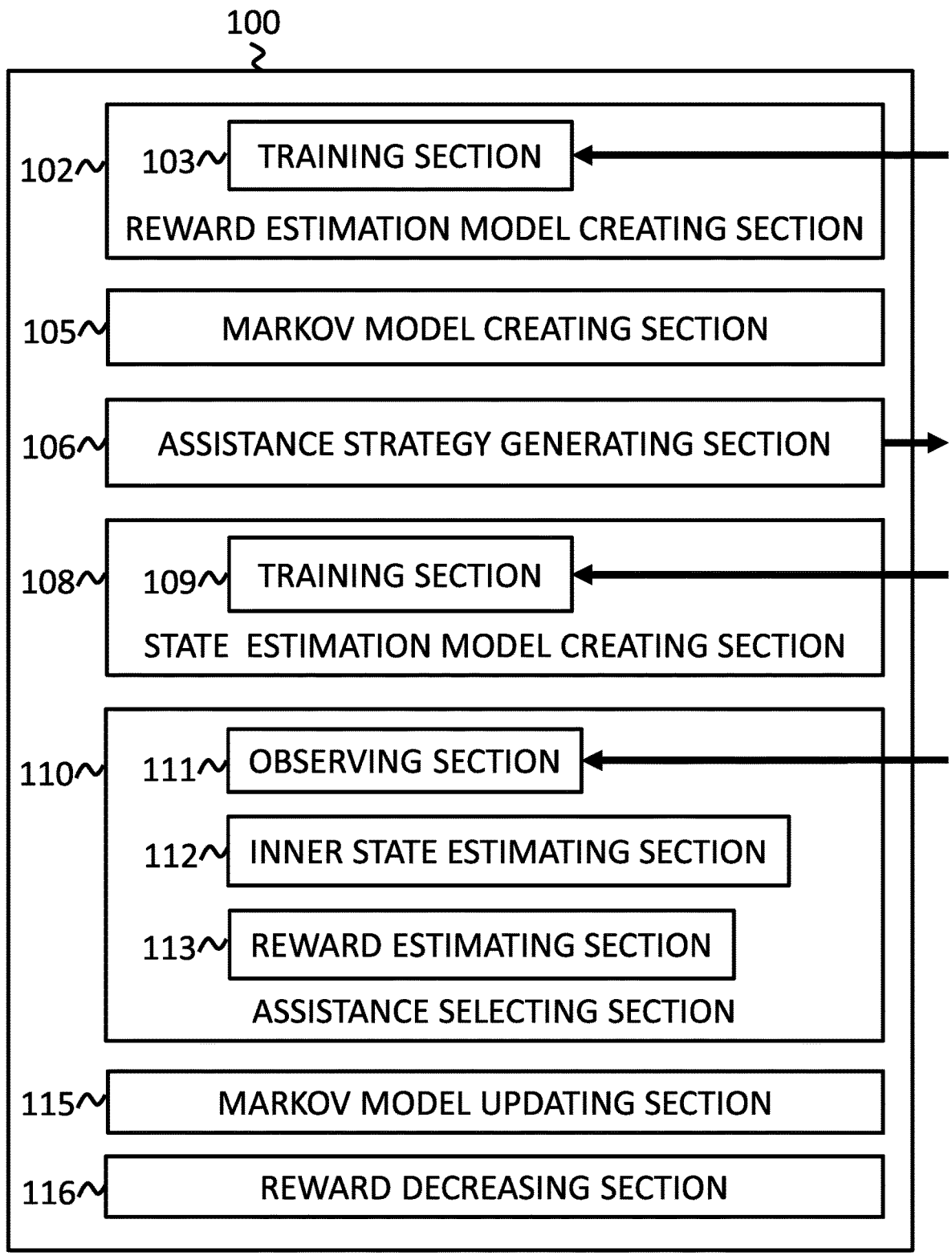
FIG. 1 shows an apparatus for assistance generation, according to an embodiment of the present invention.
Figure 9:
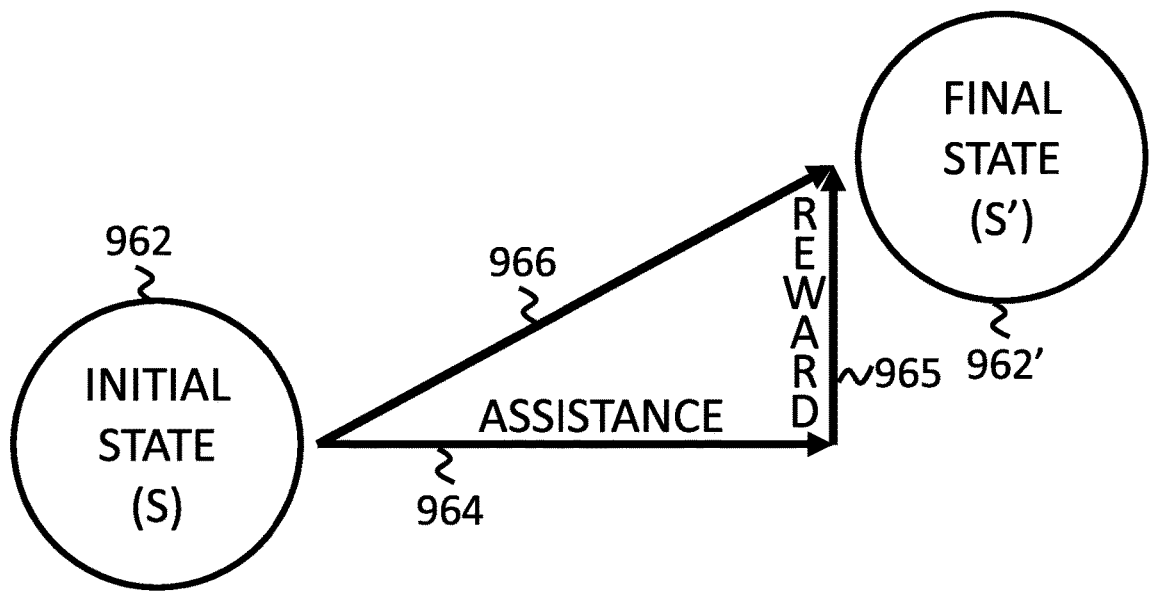
FIG. 9 shows a Markov Decision Process (MDP), according to an embodiment of the present invention.

FIG. 1 shows an apparatus 100 for assistance generation, according to an embodiment of the present invention. Apparatus 100 may continuously determine an assistance strategy with optimized balance between the exploration and the exploitation at each instance of assistance. At each instance of assistance, apparatus 100 may process an operation log, a goal flag, and an assistance flag to output an optimized assistance strategy. In this embodiment, apparatus 100 may determine the assistance strategy by creating a decision making model, which may be a Markov model based on the Markov Decision Process (MDP) as shown in FIG. 9, and/or any other kind of reinforcement learning model, etc.

In the Markov decision process, a decision maker at a state s may choose an action a which will result in a new state s' and yield a corresponding reward $R_a(s,s')$. For example, a person attempting to operate from a start point to a goal point on a map application on a smartphone may have difficulty zooming in on the map. This scenario may represent an initial state s. The person may then be presented with a message, a hint, a highlighted portion of an on-screen interface, a change in setting, or any other form of assistance to help the person zoom in on the map, or may then not be presented with anything. This assistance or non-assistance may represent an action a. Once the person perceives the assistance, the person will either realize how to zoom in on the map, still not realize how to zoom in on the map, or become more confused than previously about how to zoom in on the map. Any resulting scenario may represent a final state s'. If the person does realize how to zoom in on the map, then the final state s' is better than the initial states, which may represent a positive reward R. However, the reward R may be zero if the person still does not realize how to zoom, and may even be negative is the person is more confused than before perceiving the assistance.

Apparatus 100 may include a reward estimation model creating section 102, which includes a training section 103, a Markov model creating section 105, an assistance strategy generating section 106, a state estimation model creating section 108, which includes a training section 109, an assistance selecting section 110, which includes an observing section 111, an inner state estimating section 112, and a reward estimating section 113, a Markov model updating section 115, and a reward decreasing section 116.

Apparatus 100 may be a computer program product comprising a computer readable storage medium having program instructions embodied therewith, the program instructions executable by a computer to cause the computer to perform the operations of the various sections. Apparatus 100 may alternatively be analog or digital programmable circuitry, or any combination thereof. Apparatus 100 may be composed of physically separated storage or circuitry that interacts through communication. Apparatus 100 may be wholly or partly within a device for which assistance is desired, or wholly separate from the device for which assistance is desired. In some embodiments, a reward estimation model creating section, a Markov model creating section, an assistance strategy generating section, and a state estimation model creating section, and a Markov model updating section may be run on a server, while an assistance selecting section 110 is on run a smartphone in communication with the server.

Reward estimation model creating section 102 may create a reward estimation model for estimating a reward for assisting at least one subject by analyzing a history of input corresponding to the subject using the device for which assistance is desired. A subject may be a person, an animal, a robot, etc. In order to improve the determination of an effective form of assistance, a reward may be estimated for each potential form of assistance. By analyzing a history of the person's input, characteristics of the person can be determined. For example, if the person operates a device completely as desired, then an issue score is very low, because the person is not having any issues. If the person does not operate the device completely as desired, perhaps because of difficulty with a particular function, then the issue value is higher. This issue score is estimated from histories of observations, the number of which can be determined through cross-validation. A reward estimation model for issue score may be learned from data using conventional regression models, such as linear regression or Support Vector Regression (SVR). Further examples of this can be found in commonly owned Japanese Patent Application Publication No. 2016-058027 and U.S. patent application Ser. No. 14/849,920, filed on Sep. 10, 2015. Once an issue score is determined, a form of assistance may be evaluated to estimate the issue score once the assistance has been perceived. The difference in issue score may be the reward. The people whose input is analyzed for purposes of creating the reward estimation model need not be the same person for whom assistance with ultimately be provided. In some cases, the reward estimation model may be created before a public release of the device for which assistance is provided by the reward estimation model.

The subject's input can be anything from the user that is detectable by the device for which assistance is desired, or any behavioral or appearance aspects that can be input by an observer on behalf of the subject. For example, input can be active, such as the push of buttons, touches or swipes on a touch screen, device movement detected by an accelerometer, etc., or passive, such as detection of light, temperature, biometrics, device movement by a GPS chip, photo and/or video surveillance, audio detection, etc. Input can also be manually entered by a person who is observing the subject and/or one or more types of passive input. Input corresponds to a subject by either being input by the subject or input on behalf of the subject by an observer. Types of devices other than smartphones may have completely different forms of input, yet may still be subject to apparatus 100.

Training section 103 may train the reward estimation model by using learning data including a history of sets, each set including a form of assistance, a history of input and a corresponding reward indicated by at least one of the subject and an observer of the subject. For example, the learning data may be derived from a controlled environment whereby a person will positively indicate whether or not a particular form of assistance was helpful in improving their ability to operate a device or not. This may be performed with many people trying to perform many different gestures to achieve many different functions while being provided with many different forms of assistance. In this example, each set may include the gesture as the input, and the improvement in ability as the reward. The indication of a reward may be express, such as by the subject orally stating the reward to an observer, or implied, such as through observation of the subject. Each set is stored in a history which is part of the learning data. Training section 103 may then receive and utilize this learning data as input to train the reward estimation model, which may improve the accuracy in the estimation of a reward for presentation of a given form of assistance during a given state.

Markov model creating section 105 may create a decision making model, such as a Markov model, including a plurality of forms of assistance and estimated rewards for each form of assistance based on the reward estimation model and the history of input corresponding to the subject. By estimating rewards for different forms of assistance during different states, a web can be created interlinking states with forms of assistance and a reward associated with each form of assistance that links states. With the resultant Markov model, a proper form of assistance can be determined by identifying the current state and the desired state. For example, a person having difficulty zooming in on a map application on a smartphone may be identified as being currently in such a state. The desired state may be identified as a state in which the person knows how to zoom on the map application. By identifying these states on the Markov model, one or more forms of assistance may become apparent. Each apparent form of assistance may be associated with a reward. Selection of the form of assistance may be made based on the value of the reward. For example, a positive reward may be more preferable than a reward having a value of zero, and negative rewards may be avoided altogether.

Assistance strategy generating section 106 may generate an assistance strategy based on the decision making model. When selecting a form of assistance for a given state, it may be intuitive to simply select the form of assistance associated with the highest reward. However, this may assume that the decision making model is perfect, or that the decision making model is completely accurate. In reality, the decision making model may represent each reward as a probability distribution, and can always be improved. Improvement of the decision making model may be through feedback based on further analysis and evaluation of previously presented forms of assistance and their effect on the state. If only the form of assistance associated with the highest reward is selected, then feedback will be limited to that form of assistance. Conversely, if a form of assistance other than that which is associated with the highest reward is selected, then the chances of success are lowered, which may result in the person receiving the assistance being unsatisfied with apparatus 100. Therefore, a balance must be achieved between exploitation of forms of assistance known and proven to be successful, and exploration of unknown and unproven forms of assistance. This balance of exploration and exploitation may be a significant aspect of the assistance strategy. By evaluating Bayes posterior distribution and uncertainty of the decision making model, assistance strategy generating section 106 may optimize the balance between exploration and exploitation. Assistance strategy generating section 106 may further evaluate the uncertainty of a form of assistance when evaluating feedback concerning that form of assistance. In this way, assistance strategy generating section 106 may determine the form of assistance at the next opportunity optimistically based on the uncertainty. Assistance strategy generating section 106 may transmit the assistance strategy as output to a storage location.

State estimation model creating section 108 may create a state estimation model for estimating an inner state of the subject by analyzing the history of input corresponding to the subject. By estimating inner states, the Markov model may be improved. Therefore, the decision making model may be based further on a plurality of states, the state estimation model, and a plurality of probability distributions for state transitions cause by forms of assistance where applicable. In order to improve the determination of an effective form of assistance, an inner state may be estimated for each state in the Markov model. By analyzing a history of the person's input, characteristics of the person can be determined, such as their level of experience, level of manual dexterity, ability to learn by example, etc. A given device for which assistance is desired will not likely know what state of mind the person using the device is in without some sort of direct input. In other words, the device will not likely receive any direct input concerning whether the person is actually having difficulty operating the device. For example, a person using a map application on a smartphone will rarely directly input that the fact that the person does not know how to zoom in on the map. However, state estimating model creating section 108 may analyze a history of the person's input to estimate, for example, whether or not the person knows how to zoom in on the map application of their smartphone.

Training section 109 may train the state estimation model by using learning data including a history of sets, each set including a history of input and a corresponding inner state indicated by at least one of the subject and an observer of the subject. For example, the learning data may be derived from a controlled environment whereby a person will positively indicate their inner state before and after presentation of a particular form of assistance. This may be performed with many people trying to perform many different many different gestures to achieve many different functions while being provided with many different forms of assistance. In this example, each set may include the gesture as the input, and the inner state as a portion of the state. Each set is stored in a history which is part of the learning data. Training section 109 may then receive and utilize this learning data as input to train the state estimation model, which may improve the accuracy in the estimation of a state from which to determine a form of assistance to present. In some controlled environments, people may indicate both their inner states and the reward for a form of assistance. In these controlled environments, the learning data may be useful for training both reward estimation model 102 and state estimation model 108.

In other embodiments, a state estimation model creating section may generate a state estimation model without learning data, such as by clustering the history of input of the person operating the device for which assistance is desired. Further examples can be found in commonly owned Japanese Patent Application Publication No. 2016-058027 and U.S. patent application Ser. No. 14/849,920, filed on Sep. 10, 2015.

By estimating the state, a Markov model from which effective assistance may be determined may be created and improved without requiring a prohibitive amount of computational resources. Conversely, for example, if applying a naive MDP-based approach, effective assistance may not be determined at a realistic sampling cost because it may require a complete history of observed states. For many applications of an apparatus, such as apparatus 100, the number of states may be large enough to result in a combinatorial explosion since each state would be represented by a combination of each past observation. The immediate reward for a naive MDP-based approach might then remain at zero until a goal point is reached. For example, if a naive MDP-based approach were applied to a person operating a map application on a smartphone having difficulty zooming in on the map, a reward may only be recognized once the person were completely aware of how to zoom in, but may not be recognized at some mid-point in between a complete lack of understanding and a complete understanding, such as an understanding of the appropriate gesture, but a lack of understanding of the appropriate location or magnitude of the gesture. Therefore, with a naive MDP-based approach, Model learning may become inefficient since evaluations that did not reach the goal point may not be associated with any reward. Also conversely, approaches such as Wizard of Oz (WoO) and Partially Observable Markov Decision Process (POMDP) based models are generally associated with a large amount of computational resources, which can be cost-prohibitive. While the use of POMDP models may provide effective assistance, the number of states becomes very large, which is why a prohibitive amount of computational resources may be required. Even with a sufficient amount of computational resources, it may be impractical to provide effective assistance within an acceptable time period. However, by using a state estimation model, a person's inner state may be estimated, which may simplify the approach to that of an ordinal MDP. Thus, effective assistance may be determined significantly faster than by using a POMDP approach, and may be superior to that based on a WoO system.

In other embodiments, the relationship between input from the person operating the device for which assistance is desired and the inner state of the person is modeled as reward/state estimation model. In further embodiments, the plurality of states is based on a combination of a class of input and a class of inner states. More specifically, the plurality of states may be based upon a combination of an issue class, a gesture class, and a support class. An issue class may consist of types of issues. For example, a person operating a map application on a smartphone may have an issue such that the person does not know how to zoom in on the map. An issue class may be estimated based on a history of observations, the number of which may be determined by using cross-validation. An estimation model for an issue class may be generated from learning data using conventional classification models, such as linear classification or SVM, conventional clustering models, such as K-means or K-nearest neighbor. There may be an issue class for each important feature pattern extracted in the learning of a regression model for issue score.

A gesture class may consist of different types of input. For example, a person operating a map application on a smartphone may input single taps, swipes, double taps, etc. on a touch screen of the smartphone. A support class may simply indicate whether assistance was provided.

Assistance selecting section 110 may select an assistance to be presented to a target subject based on the assistance strategy. By referencing the Markov model, assistance selecting section 110 may select a form of assistance to present from among a finite amount of applicable forms of assistance. The form of assistance may be selected based on the estimated reward associated with each applicable form of assistance. Depending on the strategy, assistance selecting section 110 may choose to exploit the form of assistance associated with the highest reward, or choose to explore one of the forms of assistance that are not associated with the highest reward.

Observing section 111 may observe input by the target subject. By observing the input of the target person, i.e. a person operating a device for which assistance is desired, an inner state may be more accurately estimated.

Inner state estimating section 112 may estimate an estimated inner state of the target subject based on the state estimation model and the input by the target subject. The forms of assistance that are available to be presented at a given time are determined by the state at the given time. An inner state of a target person may be a large factor in estimating the state, and the input of the target person at or immediately before the given time may be a large factor in estimating the inner state. Therefore, by estimating the inner state using input by the target person, the selection of the assistance may be further based on the estimated inner state. Estimating the inner state by using input of the target person at or immediately before the given time may allow apparatus 100 to become aware of the target person's skill level continuously in real-time. In this manner, apparatus 100 may continuously adapt to provide more effective assistance to the target person. Further examples of this can be found in commonly owned Japanese Patent Application Publication No. 2016-058027 and U.S. patent application Ser. No. 14/849,920, filed on Sep. 10, 2015.

Reward estimating section 113 may estimate a reward for assisting a target subject who operates the device. The selection of the form of assistance may be further based on the estimated reward. The reward may be based on at least one of difficulty in operating the device, and improvement of operation skill. Operation skill can be scored based on at least one of a number of operations input by the target person, a length of time used for an operation, such as the length of time used from starting a pinch in/out gesture to finishing the gesture, and a smoothness of the operation. Once a reward has been estimated, it may also be used to improve the Markov model.

Markov model updating section 115 may update the decision making model based on a result of the selection of assistance. Each time a form of assistance is selected and presented, the initial state, the assistance, the final state, and the reward become part of the history or learning data, from which the Markov model may be improved. The final state may be estimated by inner state estimating section 112, and a reward may be derived either from a reward estimated by reward estimating section 113, or from a comparison of the initial state and the final state. Note that before the assistance was presented, a form of assistance was selected based on a probability of resulting in a desired state. However, after the assistance is presented, the estimated final state may be different than the desired state, and thus the derived reward may be different than the reward associated with the form of assistance in the Markov model. Markov model updating section 115 may use this new learning data to update the Markov model. Markov model updating section 115 may perform this process after every form of assistance is presented, after a certain amount of assistance is presented, every period of time, etc.

Reward decreasing section 116 may decrease a reward associated with a form of assistance if it is later discovered that the assistance presented did not match the state. In this manner, the Markov model may be improved such that the assistance will be less likely to be selected in the next applicable instance.

Figure 2A:
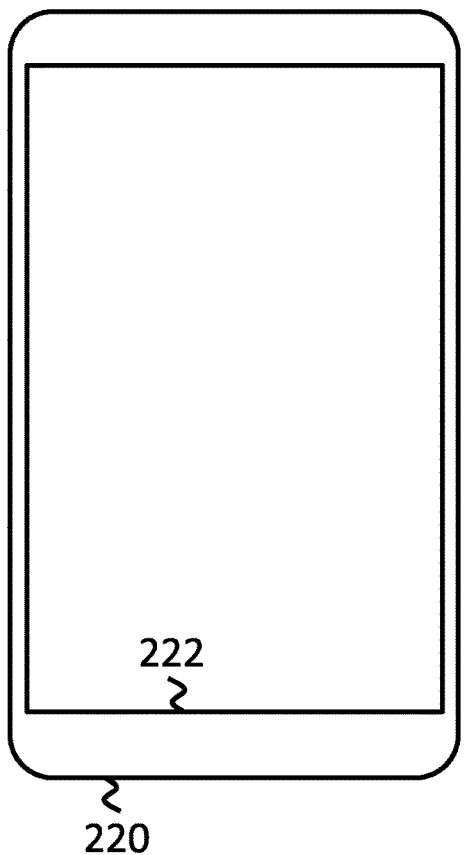
FIG. 2A shows a device for assistance generation, according to an embodiment of the present invention.
Figure 2B:
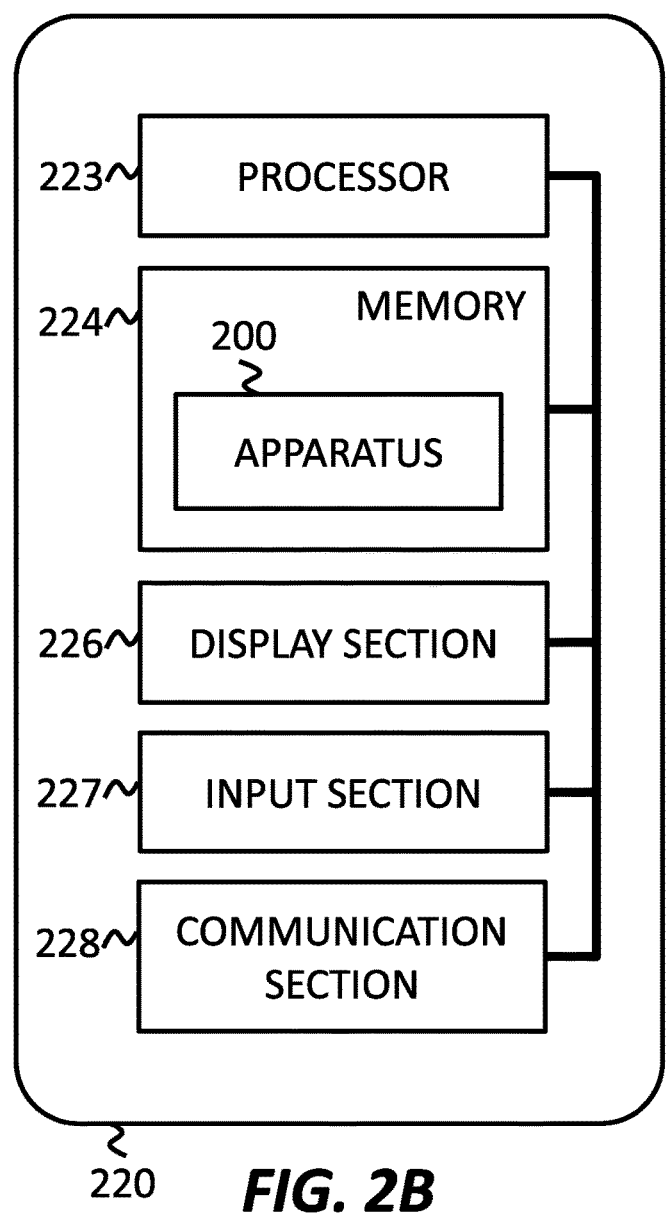
FIG. 2B shows a device for assistance generation, according to an embodiment of the present invention.

FIGS. 2A and 2B show a device 220 for assistance generation, according to an embodiment of the present invention. Device 220 may be both a generating apparatus and a device for which assistance is desired. Device 220 may include a processor 223, and memory 224 storing apparatus 200, which is a set of instructions that, when executed by processor 223, cause processor 223 to create a reward estimation model for estimating a reward for assisting at least one subject by analyzing a history of input corresponding to the subject, create a decision making model including a plurality of forms of assistance and estimated rewards for each form of assistance based on the reward estimation model and the history of input corresponding to the subject, and generate an assistance strategy based on the decision making model. Device 220 may also include touch screen 222, display section 226, input section 227, and communication section 228.

Touch screen 222 may convert manual presence or motion into electrical signals. The electrical signals may be received by input section 227 and interpreted as commands. Touch screen 222 may also display images conveying information, a user interface, media, etc. Touch screen 222 may be of any type, such as resistive-type, capacitive-type, 3-dimensional, etc. The input may refer to input to device 220, such as through touch screen 222, and the presentation of assistance may refer to the display of information, such as a help message, through an interface, such as touch screen 222, of device 220.

Processor 223 may execute instructions, such as the instructions of apparatus 200, may send data to display section 226, receive data from input section 227, and send and receive data through communication section 228. Processor 223 may be a computer processor, a microprocessor, a digital signal processor, a controller, a microcontroller, etc.

Memory 224 may store information, such as apparatus 200, a reward estimation model, a Markov model, a state estimation model, an operating system, a map application, etc., and may make such information available to processor 223 for retrieval. Memory 224 may be any computer-readable medium, such as an electronic storage medium, a magnetic storage medium, an optical storage medium, an electromagnetic storage medium, a semiconductor storage medium, etc., or more specifically a hard disk, a random access memory (RAM), a read-only memory (ROM), an erasable programmable read-only memory (EPROM or Flash memory), electrically erasable programmable read-only memory (EEPROM), a static random access memory (SRAM), a memory stick, an integrated circuit card, etc.

Display section 226 may control the display of images on touch screen 222 based on signals received from processor 224. Display section 226 may be a controller, a microcontroller, etc.

Input section 227 may send input commands to processor 223 upon receiving electrical signals from touch screen 222. Input section 227 may be a controller, a microcontroller, etc.

Communication section 228 may send and receive data through any wired or wireless communication protocol to communicate with other devices, networks, etc. Communication section 228 may be a cellular transceiver, a Wi-Fi transceiver, a BLUETOOTH® transceiver, etc.

Figure 3:
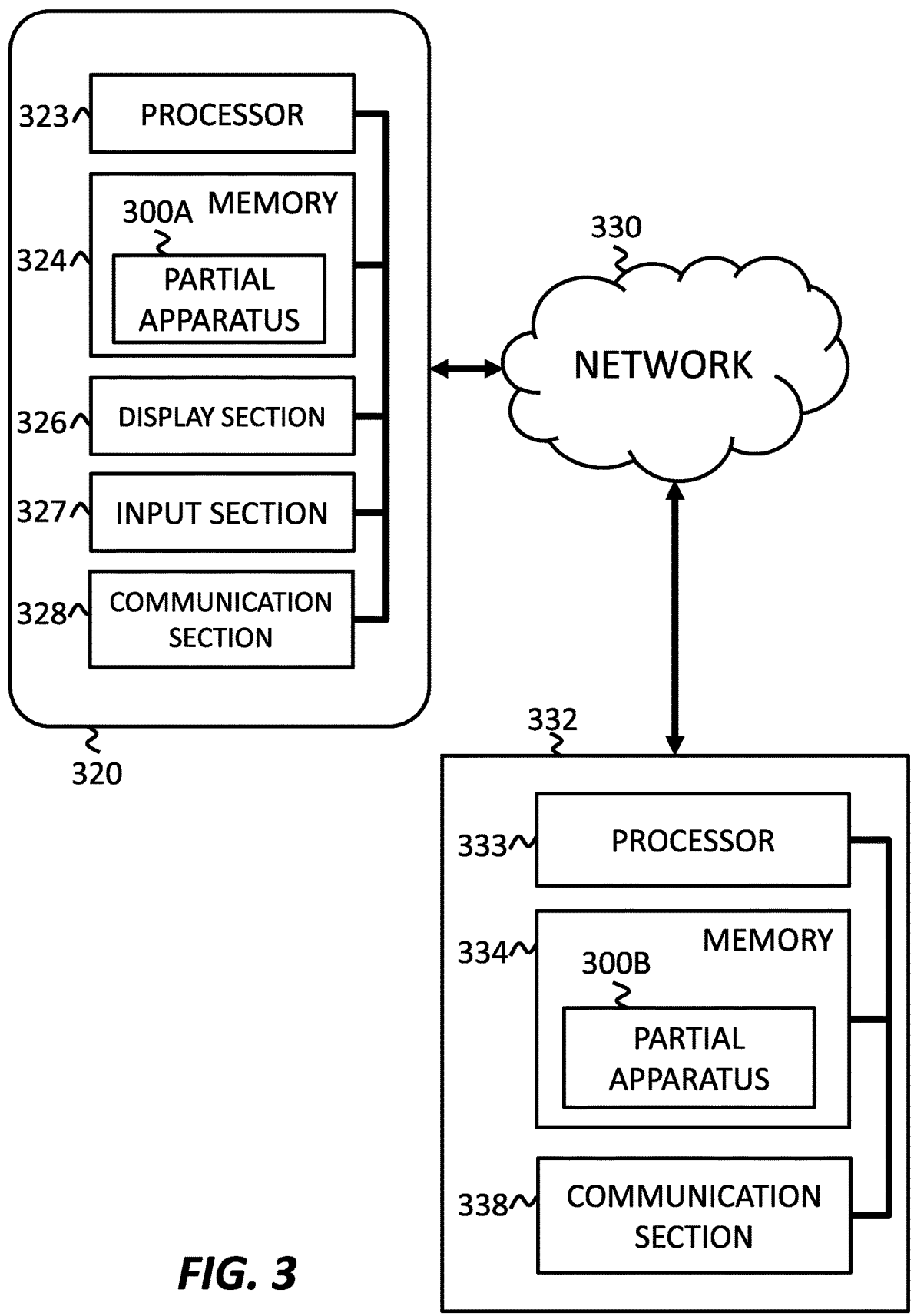
FIG. 3 shows a system for assistance generation, according to an embodiment of the present invention.

FIG. 3 shows a system for assistance generation, according to an embodiment of the present invention. The system may include a device 320, a network 330, and a server 332. Device 320, network 330, and server 332 may interact to provide effective assistance in operation of device 320.

Device 320 may include a processor 323, an interface, such as display section 326 and input section 327, in communication with processor 323, and one or more computer readable mediums, such as memory 324, collectively. Device 320 may further include a communication section 328.

The descriptions of the structures and functions of processor 223, memory 224, display section 226, input section 227, and communication section 228, as described above, may be applicable to processor 323, memory 324, display section 326, input section 327, and communication section 328, respectively.

Network 330 may establish communication between device 320 and server 330. Network 330 may be any local or wide-area network, such as the Internet, and may encompass various relays between device 320 and server 330 utilizing different forms of communication, such as wired or wireless, such as cellular protocols, Wi-Fi, etc.

Server 332 may include a processor 333, and a memory 334 storing apparatus 200, which is a set of instructions that, when executed by processor 223, cause processor 223 to create a state estimation model for estimating an inner state of the person by analyzing the history of input corresponding to the person, create a decision making model including a plurality of forms of assistance and estimated rewards for each form of assistance based on the state estimation model and the history of input corresponding to the subject, and generate an assistance strategy based on the decision making model.

The descriptions of the structures and functions of processor 223, memory 224, and communication section 228, as described above with respect to FIG. 2B, may be applicable to processor 333, memory 334, and communication section 328, respectively.

Memory 324 of device 320 stores a partial apparatus 300A, which includes at least a portion of the instructions of a complete apparatus for assistance generation, such as apparatus 100, of FIG. 1. More specifically, partial apparatus 300A includes instructions that, when executed by processor 323, cause processor 323 to receive a state estimation model for estimating an inner state of the subject by analyzing the history of input corresponding to the subject, receive an assistance strategy generated based on a decision making model, the decision making model created based on the state estimation model and the history of input corresponding to the subject, the decision making model including a plurality of states, state transitions caused by assistances, and rewards for assistances, estimate an inner state for assisting a target subject who operates device 320, select an assistance to be presented to the target subject based on the assistance strategy, and present the selected assistance through the interface.

Memory 334 of server 332 stores a partial apparatus 300B, which includes at least a portion of instructions of a complete apparatus for assistance generation, such as apparatus 100, of FIG. 1. More specifically, partial apparatus 300A includes instructions that, when executed by processor 333, cause processor 333 to create a reward estimation model for estimating a reward for assisting at least one subject by analyzing a history of input corresponding to the subject, create a decision making model including a plurality of forms of assistance and estimated rewards for each form of assistance based on the reward estimation model and the history of input corresponding to the subject, and generate an assistance strategy based on the decision making model.

In other embodiments, a system for assistance generation may include other divisions of instructions of a complete apparatus for assistance generation, such as apparatus 100. Certain instructions may be stored in and executed by a device or a server in any arrangement. In further embodiments, instructions may be stored and executed on multiple devices, multiple servers, or any combination of devices and servers. In certain embodiments, the instructions may be stored in a different location than where the instructions are executed.

Figure 4:
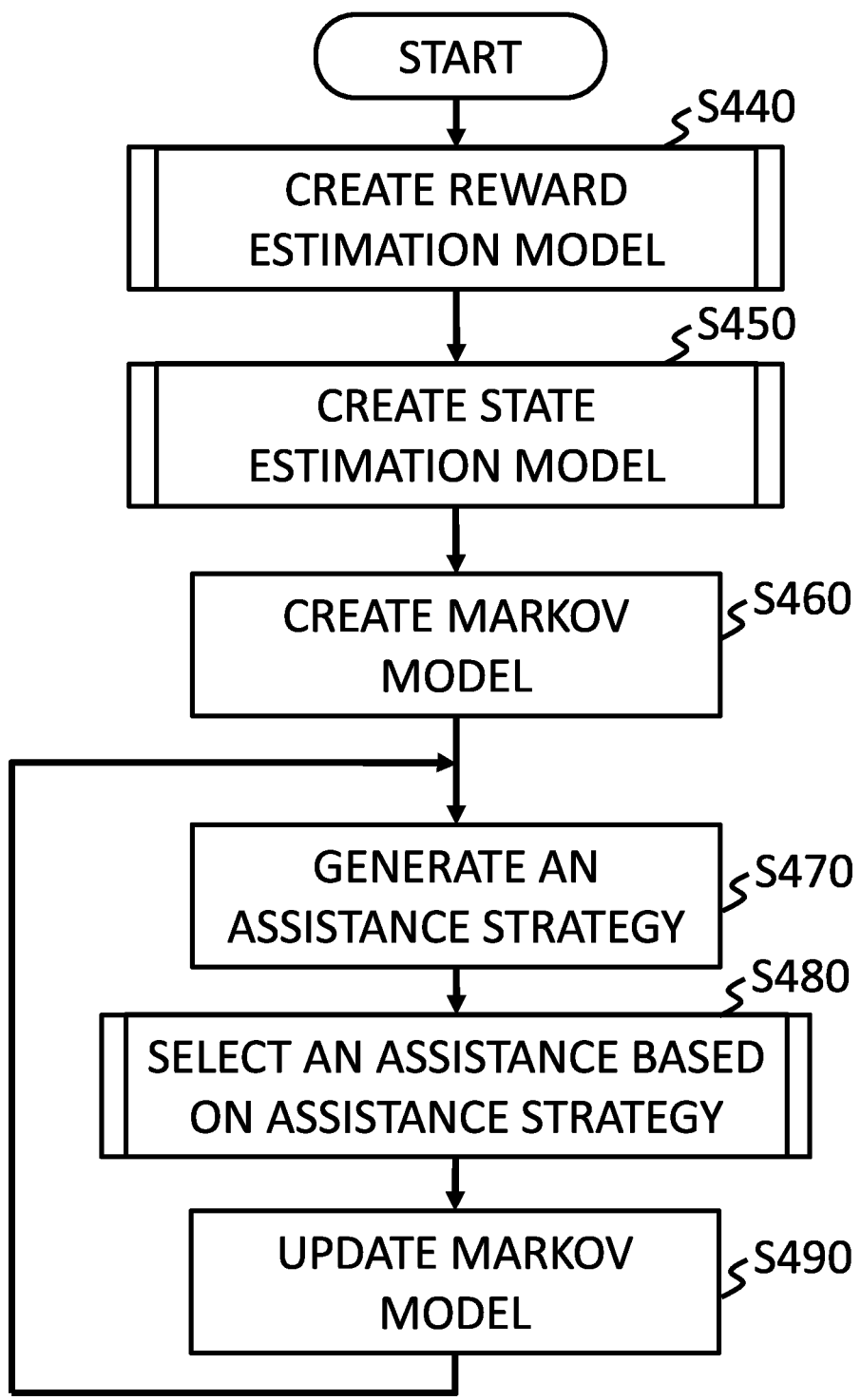
FIG. 4 shows an operational flow for assistance generation, according to an embodiment of the present invention.

FIG. 4 shows an operational flow for assistance generation, according to an embodiment of the present invention. FIG. 4 shows an example in which an apparatus, such as apparatus 100 of FIG. 1, performs operations from S440 to S490. The apparatus may generate assistance by performing the operations of S440-S490.

At S440, a reward estimation model creating section, such as reward estimation model creating section 102 if FIG. 1, may create a reward estimation model for estimating a reward for assisting at least one subject by analyzing a history of input corresponding to the subject using the device for which assistance is desired.

At S450, a state estimation model creating section, such as state estimation model creating section 108 of FIG. 1, may create a state estimation model for estimating an inner state of the subject by analyzing the history of input corresponding to the subject. Inner states may be represented by one or more issue classes, gesture classes, and support classes. Each issue class may be a specific difficulty, a specific desire, or a combination of two or more. For example, an issue class may be "Type 1 difficulty zooming in," "Type 2 difficulty in zooming in," "Type 3 difficulty in zooming in," "Difficulty in guiding navigation line," "Difficulty in using center of finger," "Desire to zoom in," "Desire to zoom out," "Desire to guide navigation line," etc. Each gesture class may consist of different types of input. For example, a gesture class may be "Unknown Gesture," "Tap," "Double Tap," "Long Tap," "Swipe," "Pinch," etc. Each support class may indicate whether or not the person has received assistance. For example, a support class may be "Assistance Received" or "No Assistance Received." Alternatively or additionally, categories or classifications of types of people described by attributes applicable to device usage. For example, categories may include "veteran user," "casual user," "basic user," "first-time user," etc. Other examples of categories may describe people in more dimensions, such as "software engineer," "taxi driver," "graphic designer," etc., each of which may convey certain strengths and weaknesses in ability to operate a given device. Categories may also be combined, which may allow for more specific considerations. For example, "veteran user, taxi driver" or "first-time user, software engineer." By estimating inner states, these strengths and weaknesses can be considered in creating the Markov model, and the Markov model may be improved. Therefore, the decision making model may be based further on a plurality of states, the state estimation model, and a plurality of probability distributions for state transitions cause by forms of assistance where applicable. In some embodiments, a state estimation model may not be created.

At S460, a Markov model creating section, such as Markov model creating section 460 of FIG. 1, may create a decision making model including a plurality of forms of assistance and estimated rewards for each form of assistance based on the reward estimation model and the history of input corresponding to the subject. The Markov model may be made once the reward estimation model and state estimation model have been created. In some embodiments, the Markov model is created without the state estimation model.

At S470, an assistance strategy generation section, such assistance strategy generation section 106 of FIG. 1, may generate an assistance strategy based on the decision making model. Once the Markov model has been created, an assistance strategy can be generated in consideration of, for example, the rewards associated with given forms of assistance, and the confidence of that reward, in order to balance exploration and exploitation while yielding effective assistance. The assistance strategy may also include, for every state, every possible assistance and the associated reward or rewards. For example, each state may be associated with rewards corresponding to the immediately following state, the next state, and so on up until the goal state. In this way, the assistance strategy may yield the most efficient or most ensured route to the goal state from any given state.

The foregoing operations S440-S470 may be performed by a server or other device separate from the device for which assistance may be desired before a public release of the device for which assistance be may desired.

At S480, an assistance selecting section, such as assistance selecting section 110 of FIG. 1, may select an assistance to be presented to a target subject based on the assistance strategy. Once an assistance strategy has been generated, the assistance strategy may be used to determine which form of assistance among applicable forms of assistance for a given state to present to the person operating a device for which assistance may be desired. This may be the form of assistance for which the largest maximum future award is associated, or may be another form of assistance, perhaps a less-tested form associated with a larger distribution. Operation S480 may be performed by the device for which assistance may be desired in communication with one or more other servers.

At S490, a Markov model updating section, such as Markov model updating section 115, may update the decision making model based on a result of the selection of assistance. Each time assistance is presented, additional learning data may be acquired and used to improve the Markov model. This may be obtained by using a reward estimating section, such as reward estimation section 113 of FIG. 1, after a goal state is reached. After the Markov model is updated, which may include modifying the probability distribution of the reward corresponding to the selected assistance, an assistance strategy may be generated (S470) based on the updated Markov model, and assistance may then be selected (S480) based on the new assistance strategy.

Figure 5:
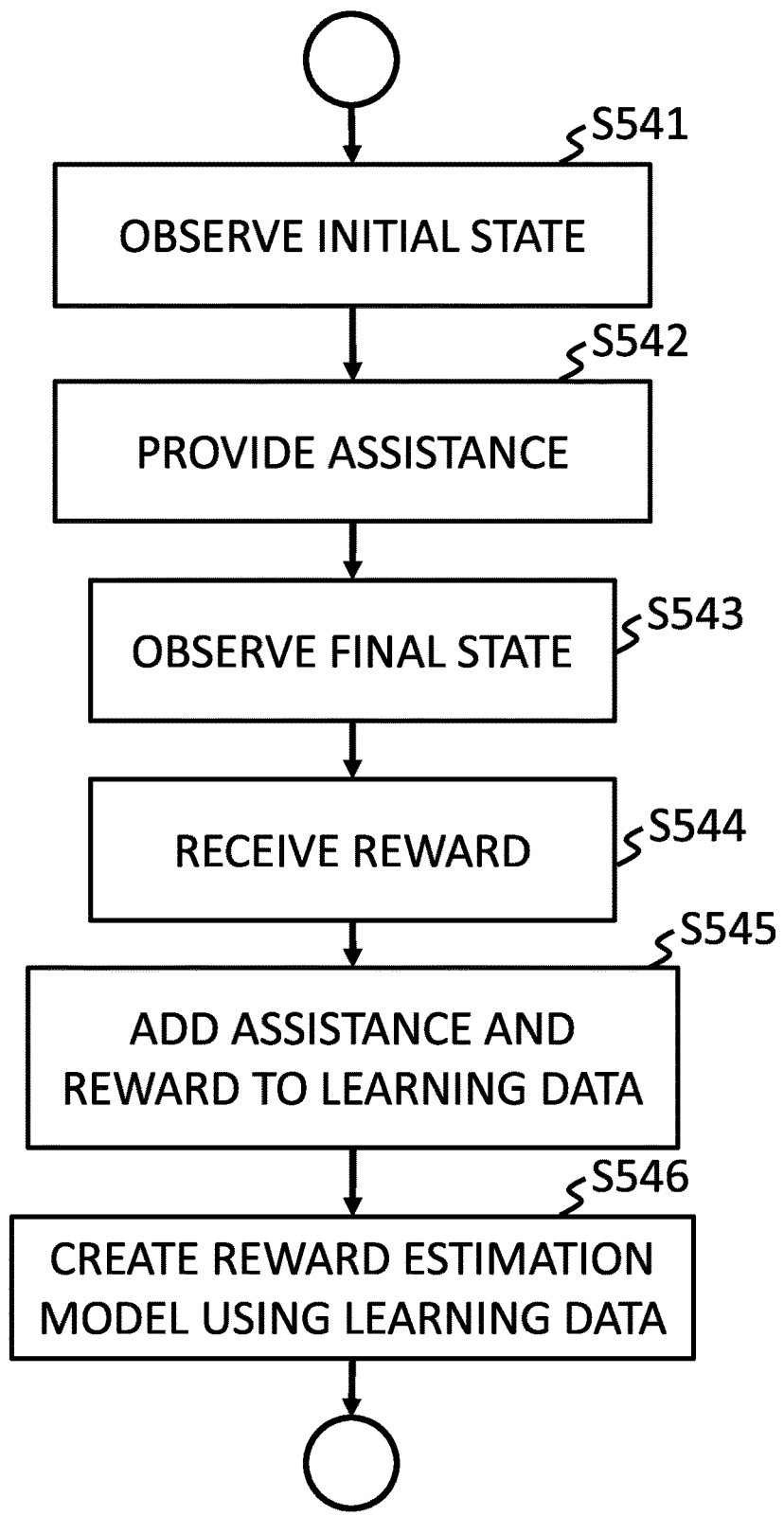
FIG. 5 shows an operational flow of creating a reward estimation model, according to an embodiment of the present invention.

FIG. 5 shows an operational flow of creating a reward estimation model, according to an embodiment of the present invention. FIG. 5 shows an example in which a reward estimation model creating section, such as reward estimation model creating section 102 of FIG. 1, performs operations from S541 to S546. The reward estimation model creating section may create a reward estimation model by performing the operations of S541-S546.

A training section, such as training section 103 of FIG. 1, may train the reward estimation model by using learning data including a history of sets, each set including a form of assistance, a history of input and a corresponding reward indicated by at least one of the subject and an observer of the subject. For example, the learning data may be derived from a controlled environment whereby a person will positively indicate whether or not a particular form of assistance was helpful in improving their ability to operate a device or not. This may be performed with many people trying to perform many different functions being provided with many different forms of assistance.

At S541, an initial state is observed. For example, it may be observed that a person operating a smartphone is having difficulty zooming in on a map application. At S542 a form of assistance is presented. For example, a help message is displayed on a screen of the smartphone for the person to read. At S543, a final state is observed. For example, it may be observed that the person understands how to zoom in on a map. At S544, a reward indicated by the person may be received. For example, the person may state the effect of the help message in learning how to zoom in on the map application. In this example, the form of assistance, which was the help message displayed on the screen of the smartphone, may be recorded as the action, and the improvement in ability, which was the ability to zoom in the map application, may be recorded as the reward. At S545, a set including the action and reward may be stored in a history where it is added to the learning data. At S546 the reward estimation model creating section may create the reward estimation model. For example, the training section may then utilize this learning data to train the reward estimation model, which may improve the accuracy in the estimation of a reward for presentation of a given form of assistance during a given state.

Further examples of creating a reward estimation model can be found in commonly owned Japanese Patent Application Publication No. 2016-058027 and U.S. patent application Ser. No. 14/849,920, filed on Sep. 10, 2015.

Figure 6:
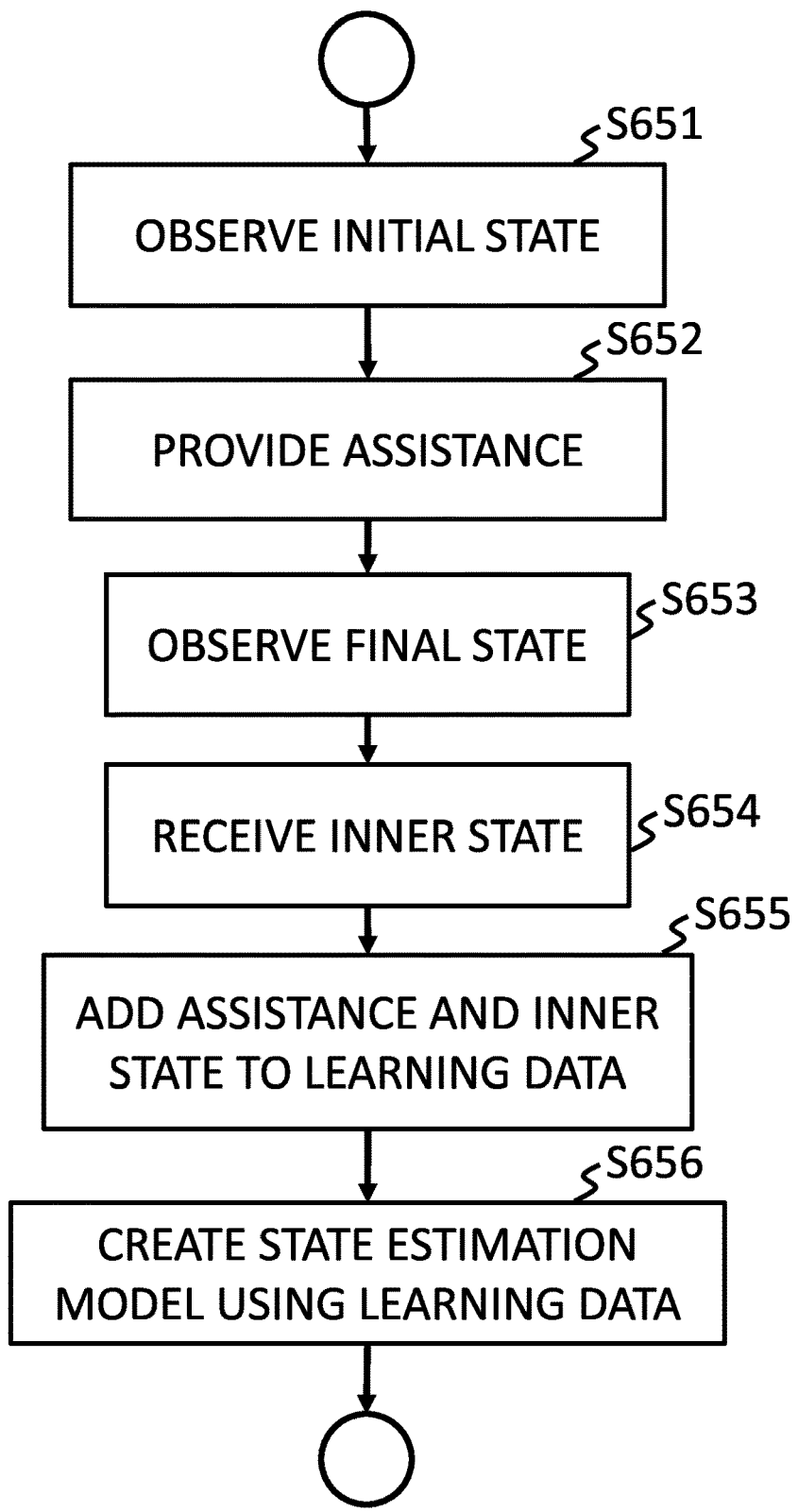
FIG. 6 shows an operational flow of creating a state estimation model, according to an embodiment of the present invention.

FIG. 6 shows an operational flow of creating a state estimation model, according to an embodiment of the present invention. FIG. 6 shows an example in which a state estimation model creating section, such as state estimation model creating section 108 of FIG. 1, performs operations from S651 to S656. The state estimation model creating section may create a state estimation model by performing the operations of S651-S656.

A training section, such as training section 109 of FIG. 1, may train the state estimation model by using learning data including a history of sets, each set including a history of input and a corresponding inner state indicated by at least one of the subject and an observer of the subject. For example, the learning data may be derived from a controlled environment whereby a person will positively indicate their inner state before and after presentation of a particular form of assistance. This may be performed with many people trying to perform many different functions being provided with many different forms of assistance.

At S651, an initial state is observed. For example, it may be observed that a person operating a smartphone is having difficulty zooming in on a map application. At S652 a form of assistance is presented. For example, a help message is displayed on a screen of the smartphone for the person to read. At S653, a final state is observed. For example, it may be observed that the person understands how to zoom in on a map. At S654, an inner state indicated by the person may be received. For example, the person may state their state of understanding of the zoom function of the map application before receiving the help message. In this example, the form of assistance, which was the help message displayed on the screen of the smartphone, may be recorded as the action, and the inner state, which was the state of understanding of the zoom function of the map application before receiving the help message, may be recorded as a portion of the state. At S655, a set including the action and inner state may be stored in a history where it is added to the learning data. At S656 the state estimation model creating section may create the state estimation model. For example, the training section may then utilize this learning data to train the state estimation model, which may improve the accuracy in the estimation of a state from which to determine a form of assistance to present.

Figure 7:
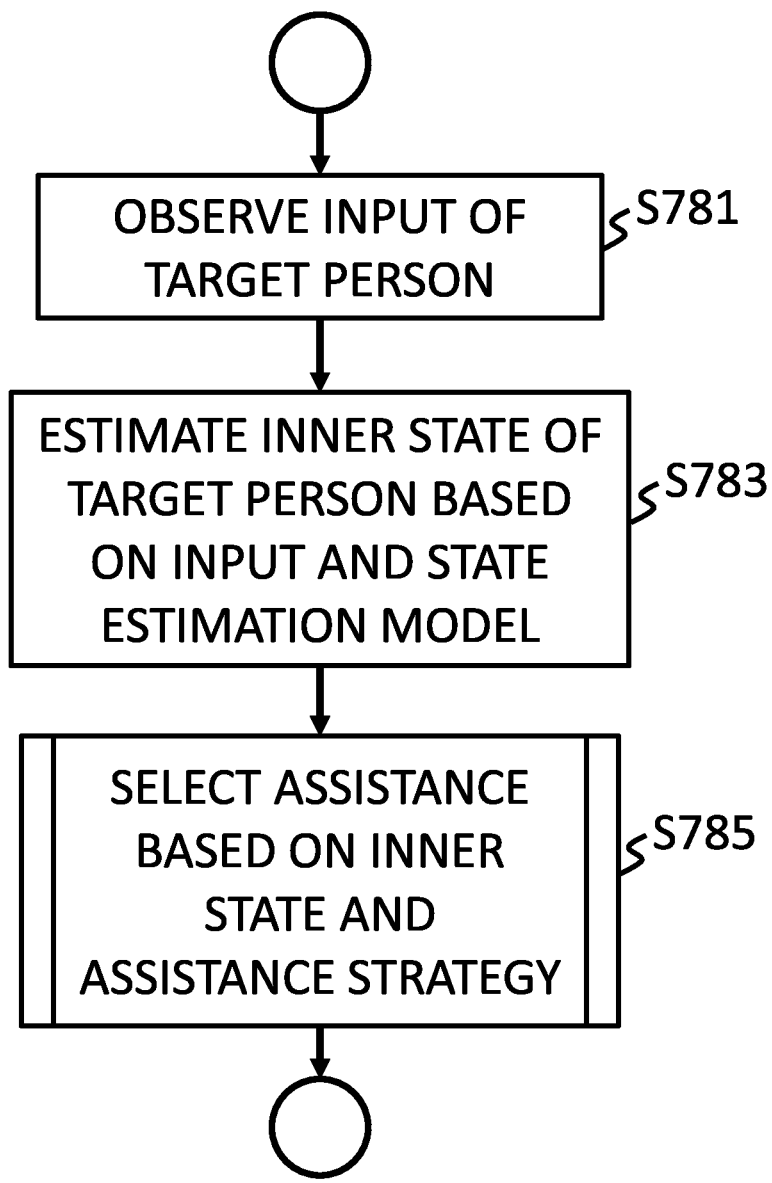
FIG. 7 shows an operational flow of selecting an assistance based on the assistance strategy, according to an embodiment of the present invention.

FIG. 7 shows an operational flow of selecting an assistance based on the assistance strategy, according to an embodiment of the present invention. FIG. 7 shows an example in which an assistance selecting section, such as assistance selecting section 110 of FIG. 1, performs operations from S781 to S785. The assistance selecting section may select assistance by performing the operations of S781-S785.

At S781, an observing section, such as observing section 111 of FIG. 1, may observe input corresponding to the target subject. By observing the input of the target subject, i.e. a subject operating a device for which assistance is desired, an inner state may be more accurately estimated.

At S783, an inner state estimating section, such as inner state estimating section 112, may estimate an estimated inner state of the target subject based on the state estimation model and the input corresponding to the target subject. By estimating the inner state using input corresponding to the target subject, the selection of the assistance may be further based on the estimated inner state.

At S785, the assistance selecting section may select a form of assistance based on the estimated inner state and the assistance strategy, to be presented to a person operating a device for which assistance may be desired.

Figure 8:
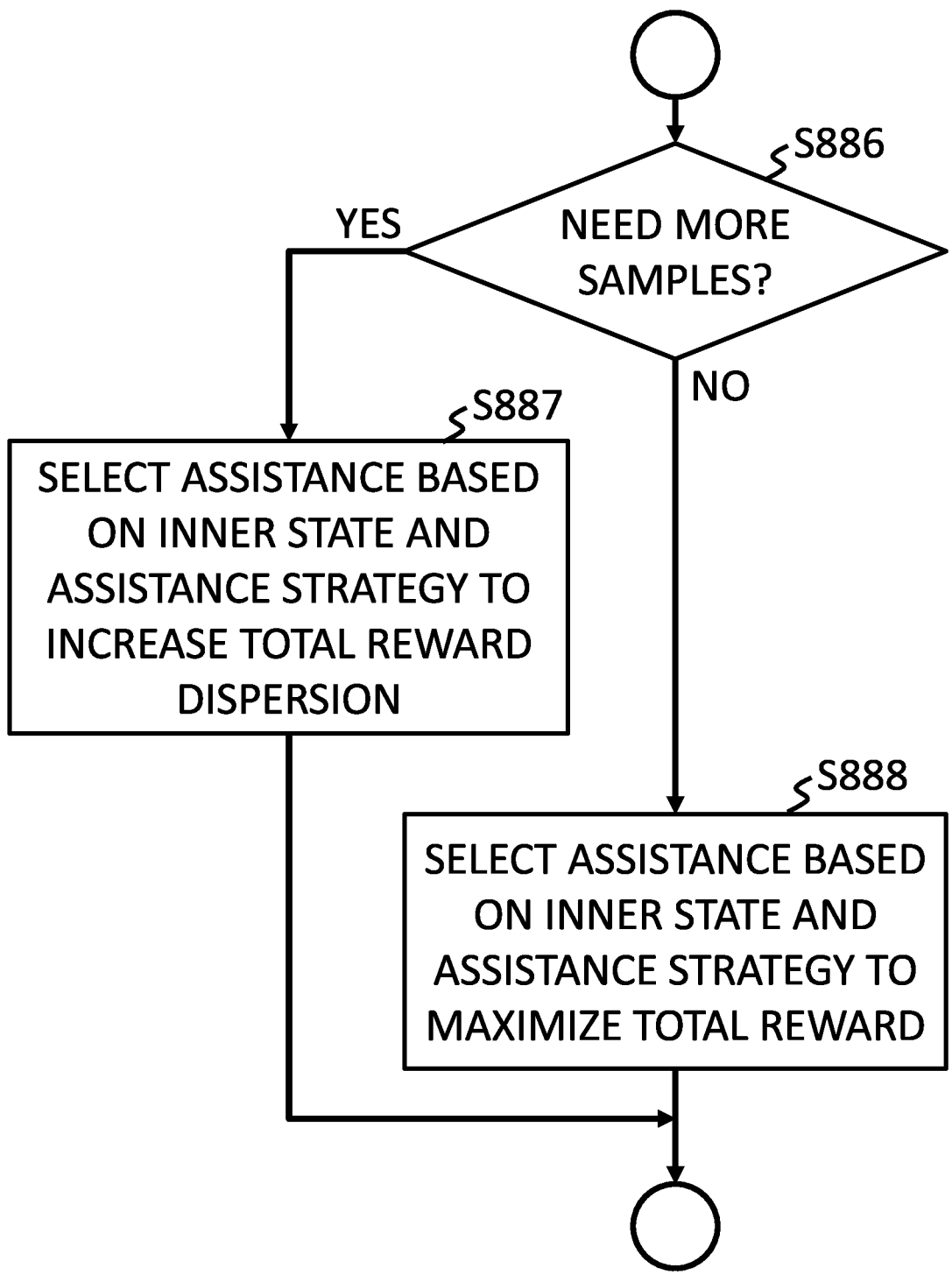
FIG. 8 shows an operational flow of selecting an assistance based on the assistance strategy, according to an embodiment of the present invention.

FIG. 8 shows an operational flow of selecting an assistance based on the assistance strategy, according to an embodiment of the present invention. FIG. 8 shows an example in which an assistance selecting section, such as assistance selecting section 110 of FIG. 1, performs operations from S886 to S888. The assistance selecting section may select assistance by performing the operations of S886-S888.

At S886, it is determined whether more samples are needed to improve the confidence that the selection of a certain form of assistance among applicable forms of assistance for a given state. For example, even though a certain form may be associated with a high reward, if assistance for that particular state has only been presented a limited number of times, then there is a greater possibility for the associated rewards to be skewed, or otherwise misrepresentative. In order to strengthen the confidence, or correct the representation, each form of assistance may be evaluated many times. At the same time, there is a need to optimize the user experience by providing support based on the preliminary evaluations. However, when the preliminary evaluation data is based on a limited number of times, a balance between exploration of uncertain forms of assistance and exploitation of forms of assistance that are associated with the highest reward. Another option is to randomly select a form of assistance, and a further option is to select the form of assistance associated with the largest average+ $\alpha$*distribution, where $\alpha$ is a prescribed variable.

If more samples are needed (YES), such as cases where the confidence is insufficient, then the operational flow proceeds to S887, at which the selection of the assistance is based on an inner state and an assistance strategy to increase a dispersion of a total reward of transitioning the Markov model. For example, a form of assistance other than the form of assistance associated with the highest reward may be selected so that all applicable forms of assistance are sufficiently explored.

If more samples are not needed (NO), such as cases where the confidence is sufficient, then the operational flow proceeds to S888, at which the selection of the assistance is based on an inner state and an assistance strategy to maximize a total reward of transitioning the decision making model. For example, a form of assistance with the highest reward may be selected to maximize the possibility that the person will be satisfied with the assistance.

FIG. 9 shows a Markov Decision Process (MDP), according to an embodiment of the present invention. As previously described, in the Markov decision process, a decision maker at a state s may choose an action a which will result in a new state s' and yield a corresponding reward $R_a(s,s')$. As shown in FIG. 9, an initial state 962 may serve as a starting point at which assistance 964 may be presented. As assistance 964 is presented, initial state 962 may transition to final state 962'. Depending on how beneficial assistance 964 was, final state 962' may be a relatively better state, a relatively even state, or a relatively worse state. In this embodiment, final state 962' is shown to be relatively better than initial state 962, which is indicated by a positive reward 965. In other cases, the reward may be zero or even negative, such as in the case of the final state being relatively worse than the initial state. Transition vector 966 is based on the assistance and the reward, as shown. In some cases, the assistance may in fact be a lack of assistance, and mere passage of time.

Figure 10:
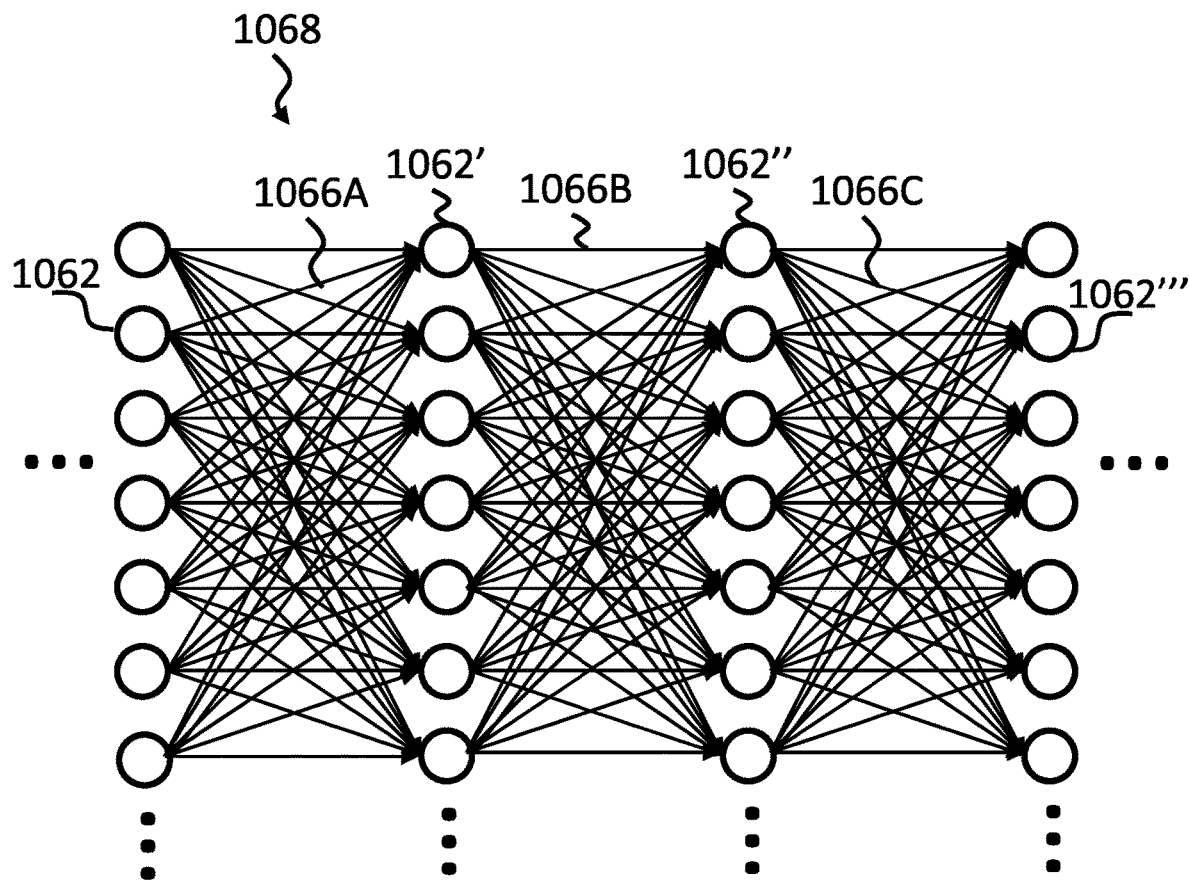
FIG. 10 shows a Markov model, according to an embodiment of the present invention.

FIG. 10 shows a Markov model 1068, according to an embodiment of the present invention. As previously described, by estimating rewards for different forms of assistance during different states, a web can be created interlinking states with forms of assistance and a reward associated with each form of assistance that links states. Only a portion of Markov model is shown as the model may include a number of states having many orders of magnitude. Markov model 1068 includes states 1062, 1062', 1062", and 1062''' as example states among many others, and transition vectors 1066A, 1066B, and 1066C, as example transition vectors among many others. For example, at a given time t1, a person operating a device for which assistance may be desired may be in an initial state represented by 1062. Then, assistance is presented resulting in a final state represented by final state 1062' at a time t2. The transition from initial state 1062 to final state 1062' is represented by transition vector 1066A, which is positive in the Y-direction, meaning that final state 1062' is relatively better than initial state 1062, which implies that the assistance presented was likely beneficial. At time t2, state 1062' becomes the initial state, and assistance is presented resulting in a final state represented by final state 1062" at a time t3. The transition from initial state 1062' to final state 1062" is represented by transition vector 1066B, which is neutral in the Y-direction, meaning that final state 1062" is relatively similar to initial state 1062', which implies that the assistance presented was likely neither beneficial nor harmful. At time t3, state 1062" becomes the initial state, and assistance is presented resulting in a final state represented by final state 1062''' at a time t4. The transition from initial state 1062" to final state 1062'" is represented by transition vector 1066C, which is negative in the Y-direction, meaning that final state 1062'" is a relatively worse than initial state 1062", which implies that the assistance presented was likely harmful.

Creation of the Markov model may include setting and adjusting transition vectors to accurately reflect the reward associated with the assistance at the given state. Selecting assistance using the Markov model may include selecting the applicable form of assistance associated with the most positive transition vector, or selecting another applicable form of assistance, the selection depending on how the assistance strategy balances between exploration and exploitation. Updating the Markov model may include further adjusting the transition vectors in response to data learned from usage.

Figure 11:
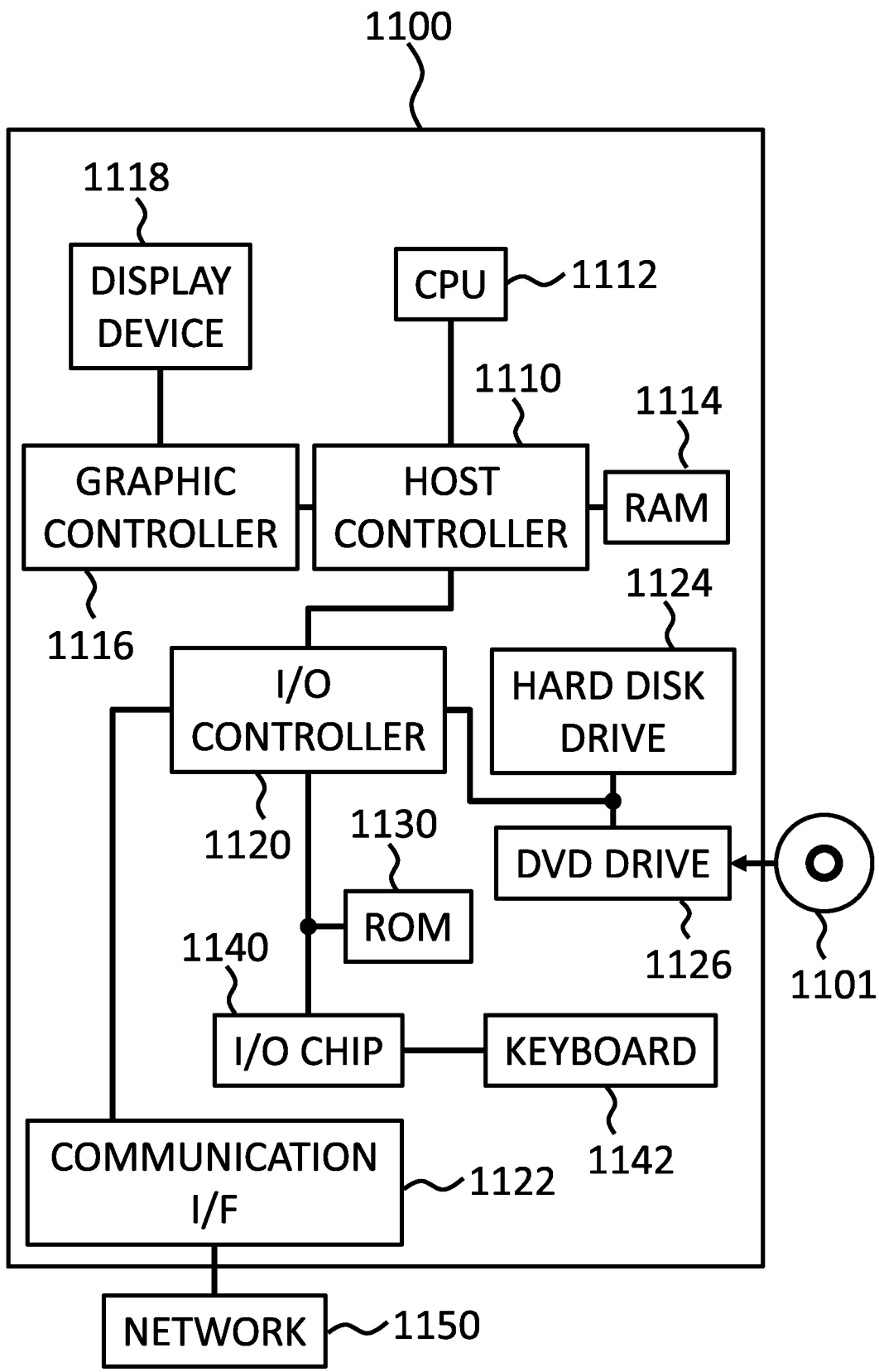
FIG. 11 shows an exemplary hardware configuration of a computer that functions as an apparatus, according to an embodiment of the present invention.

FIG. 11 shows an example of a computer 1100 in which aspects of the present invention may be wholly or partly embodied. A program that is installed in the computer 1100 can cause the computer 1100 to function as or perform operations associated with apparatuses of the embodiments of the present invention or one or more sections (including modules, components, elements, databases, etc.) thereof, and/or cause the computer 1100 to perform processes of the embodiments of the present invention or steps thereof. Such a program may be executed by the CPU 1112 to cause the computer 1100 to perform certain operations associated with some or all of the blocks of flowcharts and block diagrams described herein.

The computer 1100 according to the present embodiment includes a CPU 1112, a RAM 1114, a graphics controller 1116, and a display device 1118, which are mutually connected by a host controller 1110. The computer 1100 also includes input/output units such as a communication interface 1122, a hard disk drive 1124, a DVD-ROM drive 1126 and an IC card drive, which are connected to the host controller 1110 via an input/output controller 1120. The computer also includes legacy input/output units such as a ROM 1130 and a keyboard 1142, which are connected to the input/output controller 1120 through an input/output chip 1140.

The CPU 1112 operates according to programs stored in the ROM 1130 and the RAM 1114, thereby controlling each unit. The graphics controller 1116 obtains image data generated by the CPU 1112 on a frame buffer or the like provided in the RAM 1114 or in itself, and causes the image data to be displayed on the display device 1118.

The communication interface 1122 communicates with other electronic devices via a network 1150. The hard disk drive 1124 stores programs and data used by the CPU 1112 within the computer 1100. The DVD-ROM drive 1126 reads the programs or the data from the DVD-ROM 1101, and provides the hard disk drive 1124 with the programs or the data via the RAM 1114. The IC card drive reads programs and data from an IC card, and/or writes programs and data into the IC card.

The ROM 1130 stores therein a boot program or the like executed by the computer 1100 at the time of activation, and/or a program depending on the hardware of the computer 1100. The input/output chip 1140 may also connect various input/output units via a parallel port, a serial port, a keyboard port, a mouse port, and the like to the input/output controller 1120.

A program is provided by computer readable media such as the DVD-ROM 1101 or the IC card. The program is read from the computer readable media, installed into the hard disk drive 1124, RAM 1114, or ROM 1130, which are also examples of computer readable media, and executed by the CPU 1112. The information processing described in these programs is read into the computer 1100, resulting in cooperation between a program and the above-mentioned various types of hardware resources. An apparatus or method may be constituted by realizing the operation or processing of information in accordance with the usage of the computer 1100.

For example, when communication is performed between the computer 1100 and an external device, the CPU 1112 may execute a communication program loaded onto the RAM 1114 to instruct communication processing to the communication interface 1122, based on the processing described in the communication program. The communication interface 1122, under control of the CPU 1112, reads transmission data stored on a transmission buffering region provided in a recording medium such as the RAM 1114, the hard disk drive 1124, the DVD-ROM 1101, or the IC card, and transmits the read transmission data to network 1150 or writes reception data received from network 1150 to a reception buffering region or the like provided on the recording medium.

In addition, the CPU 1112 may cause all or a necessary portion of a file or a database to be read into the RAM 1114, the file or the database having been stored in an external recording medium such as the hard disk drive 1124, the DVD-ROM drive 1126 (DVD-ROM 1101), the IC card, etc., and perform various types of processing on the data on the RAM 1114. The CPU 1112 may then write back the processed data to the external recording medium.

Various types of information, such as various types of programs, data, tables, and databases, may be stored in the recording medium to undergo information processing. The CPU 1112 may perform various types of processing on the data read from the RAM 1114, which includes various types of operations, processing of information, condition judging, conditional branch, unconditional branch, search/replace of information, etc., as described throughout this disclosure and designated by an instruction sequence of programs, and writes the result back to the RAM 1114. In addition, the CPU 1112 may search for information in a file, a database, etc., in the recording medium. For example, when a plurality of entries, each having an attribute value of a first attribute is associated with an attribute value of a second attribute, are stored in the recording medium, the CPU 1112 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 1100. In addition, a recording medium such as a hard disk or a RAM provided in a server system connected to a dedicated communication network or the Internet can be used as the computer readable media, thereby providing the program to the computer 1100 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A generating apparatus comprising:
a processor; and
one or more non-transitory computer readable mediums collectively including instructions that, when executed by the processor, cause the processor to:
create a reward estimation model for estimating an estimated reward for assisting at least one subject by analyzing a history of input corresponding to the subject to determine a level of experience of the subject in operating a particular device;
create a decision making model including a plurality of forms of assistance and estimated rewards for each form of assistance based on the reward estimation model and the history of input corresponding to the subject; and
generate an assistance strategy based on the decision making model, the assistance strategy comprising maximizing a total reward when a confidence level is determined to be sufficient and increasing a dispersion of the total reward when the confidence level is determined to be insufficient, the assistance strategy further comprising strengthening the confidence level by iteratively evaluating each of the plurality of forms of assistance and balancing exploration of uncertain forms of assistance and exploitation of forms of assistance associated with a highest reward based on feedback from the subject positively indicating whether a particular form of assistance from the plurality of forms of assistance improves an ability of the subject to operate the particular device.

2. The generating apparatus of claim 1, wherein the creation of the reward estimation model includes training the reward estimation model by using first learning data including a history of first sets,
wherein each first set includes a form of assistance, the history of input and a corresponding reward indicated by at least one of the subject and an observer of the subject.

3. The generating apparatus of claim 2, wherein:
the instructions further cause the processor to create a state estimation model for estimating an inner state of the subject by analyzing the history of input corresponding to the subject; and
the decision making model is based further on a plurality of states, the state estimation model, and a plurality of probability distributions for state transitions caused by forms of assistance.

4. The generating apparatus of claim 3, wherein the creation of the state estimation model includes training the state estimation model by using second learning data including a history of second sets,
wherein each second set includes the history of input and a corresponding inner state indicated by at least one of the subject and an observer of the subject.

5. The generating apparatus of claim 3, wherein the plurality of states is based on a combination of a class of assistance and a class of inner states.

6. The generating apparatus of claim 3, wherein the instructions further cause the processor to select an assistance to be presented to a target subject based on the assistance strategy.

7. The generating apparatus of claim 6, wherein the instructions further cause the processor to:
observe input corresponding to the target subject; and
estimate an estimated inner state of the target subject based on the state estimation model and the history of input corresponding to the target subject, and
wherein the selection of the assistance is further based on the estimated inner state.

8. The generating apparatus of claim 6, wherein the selection of the assistance is further based on:
a strategy to optimize a balance between exploitation of forms of assistance among the plurality of forms of assistance that are expected to be successful; and
an exploration of forms of assistance that have not been validated to be successful.

9. The generating apparatus of claim 8, wherein the balance is optimized based on a Bayesian posterior distribution for the decision making model.

10. The generating apparatus of claim 6, wherein the instructions further cause the processor to update the decision making model based on a result of the selection of assistance.

11. The generating apparatus of claim 1, wherein:
the input is to the particular device, and
the assistance presents a help message through an interface of the particular device.

12. The generating apparatus of claim 11, wherein the reward is based on input selected from the group consisting of a difficulty in operating the particular device and an improvement of operation skill.

13. The generating apparatus of claim 1, wherein the creation of the decision making model includes decreasing the reward if mismatched assistance is presented.

14. A computer program product comprising a non-transitory computer readable storage medium having program instructions embodied therewith, the program instructions executable by a computer to cause the computer to perform the steps of:
creating a reward estimation model for estimating a reward for assisting at least one subject by analyzing a history of input corresponding to the subject to determine a level of experience of the subject in operating a particular device;
creating a decision making model including a plurality of forms of assistance and estimated rewards for each form of assistance based on the reward estimation model and the history of input corresponding to the subject; and
generating an assistance strategy based on the decision making model, the assistance strategy comprising maximizing a total reward when a confidence level is determined to be sufficient and increasing a dispersion of the total reward when the confidence level is determined to be insufficient, the assistance strategy further comprising strengthening the confidence level by iteratively evaluating each of the plurality of forms of assistance and balancing exploration of uncertain forms of assistance and exploitation of forms of assistance associated with a highest reward based on feedback from the subject positively indicating whether a particular form of assistance from the plurality of forms of assistance improves an ability of the subject to operate the particular device.

15. The computer program product of claim 14, further comprising:
training the reward estimation model by using a first learning data including a history of first sets, each first set including a form of assistance, the history of input and a corresponding reward indicated by at least one of the subject and an observer of the subject.

16. The computer program product of claim 15, further comprising creating a state estimation model for estimating an inner state of the subject by analyzing the history of input corresponding to the subject, wherein the decision making model is based further on:
   a plurality of states;
   the state estimation model; and
   a plurality of probability distributions for state transitions cause by forms of assistance.

17. A computer-implemented method comprising:
   creating a reward estimation model for estimating a reward for assisting at least one subject by analyzing a history of input corresponding to the subject to determine a level of experience of the subject in operating a particular device;
   creating a decision making model including a plurality of forms of assistance and estimated rewards for each form of assistance based on the reward estimation model and the history of input corresponding to the subject; and
   generating an assistance strategy, using a processor, based on the decision making model, the assistance strategy comprising maximizing a total reward when a confidence level is determined to be sufficient and increasing a dispersion of the total reward when the confidence level is determined to be insufficient, the assistance strategy further comprising strengthening the confidence level by iteratively evaluating each of the plurality of forms of assistance and balancing exploration of uncertain forms of assistance and exploitation of forms of assistance associated with a highest reward based on feedback from the subject positively indicating whether a particular form of assistance from the plurality of forms of assistance improves an ability of the subject to operate the particular device.

18. The method of claim 17, further comprising training the reward estimation model by using a first learning data including a history of first sets, each first set including:
   a form of assistance;
   the history of input; and
   a corresponding reward indicated by at least one of the subject and an observer of the subject.

19. The method of claim 18, further comprising:
   creating a state estimation model for estimating an inner state of the subject by analyzing the history of input corresponding to the subject, wherein the decision making model is based further on a plurality of states, the state estimation model, and a plurality of probability distributions for state transitions cause by forms of assistance.

* * * * *